(12) United States Patent
Brandes

(10) Patent No.: US 6,981,216 B1
(45) Date of Patent: Dec. 27, 2005

(54) METHOD AND SYSTEM FOR SUBPOENA GENERATION INCLUDING TIME-DEPENDENT REVERSE NUMBER SEARCH

(76) Inventor: George A. Brandes, 70 Trommel Dr., Mahwah, NJ (US) 07430

( * ) Notice: Subject to any disclaimer, the term of this patent is extended or adjusted under 35 U.S.C. 154(b) by 624 days.

(21) Appl. No.: 09/710,506

(22) Filed: Nov. 9, 2000

(51) Int. Cl.[7] .............................................. G06F 17/30
(52) U.S. Cl. ...................... 715/530; 715/505; 715/506
(58) Field of Search .............................. 715/500, 500.1, 715/505, 506, 507, 515, 530

(56) References Cited

U.S. PATENT DOCUMENTS

| | | | | |
|---|---|---|---|---|
| 5,799,073 A | * | 8/1998 | Fleischer et al. | 379/112.01 |
| 5,805,677 A | * | 9/1998 | Ferry et al. | 379/93.35 |
| 5,903,636 A | * | 5/1999 | Malik | 379/142.01 |
| 6,097,798 A | * | 8/2000 | Albers et al. | 379/114.28 |
| 6,229,887 B1 | * | 5/2001 | Albers et al. | 379/219 |
| 6,442,549 B1 | * | 8/2002 | Schneider | 707/10 |
| 6,650,633 B1 | * | 11/2003 | Albers et al. | 370/352 |
| 6,651,060 B1 | * | 11/2003 | Harper et al. | 707/9 |

* cited by examiner

Primary Examiner—Stephen Hong
Assistant Examiner—Gregory J. Vaughn
(74) Attorney, Agent, or Firm—Duane Morris LLP

(57) ABSTRACT

A method and system for obtaining information items associated with the generation of subpoena documents using time-dependent data bases is presented. In accordance with the principles of the invention, the names and contact information of telephone companies that were assigned designated telephone numbers during designated time periods may be obtained using data bases formulated to include time-dependent telephone company assignment information items. From the information items, subpoenas are then generated which compel the selected telephone companies to reveal subscriber information items, such as name and address, associated with the designated telephone number during the designated time period. Further, the subpoenas containing the user's name can be generated to compel the subscriber to appear be a court or agency competent jurisdiction or disclose additional information.

14 Claims, 6 Drawing Sheets

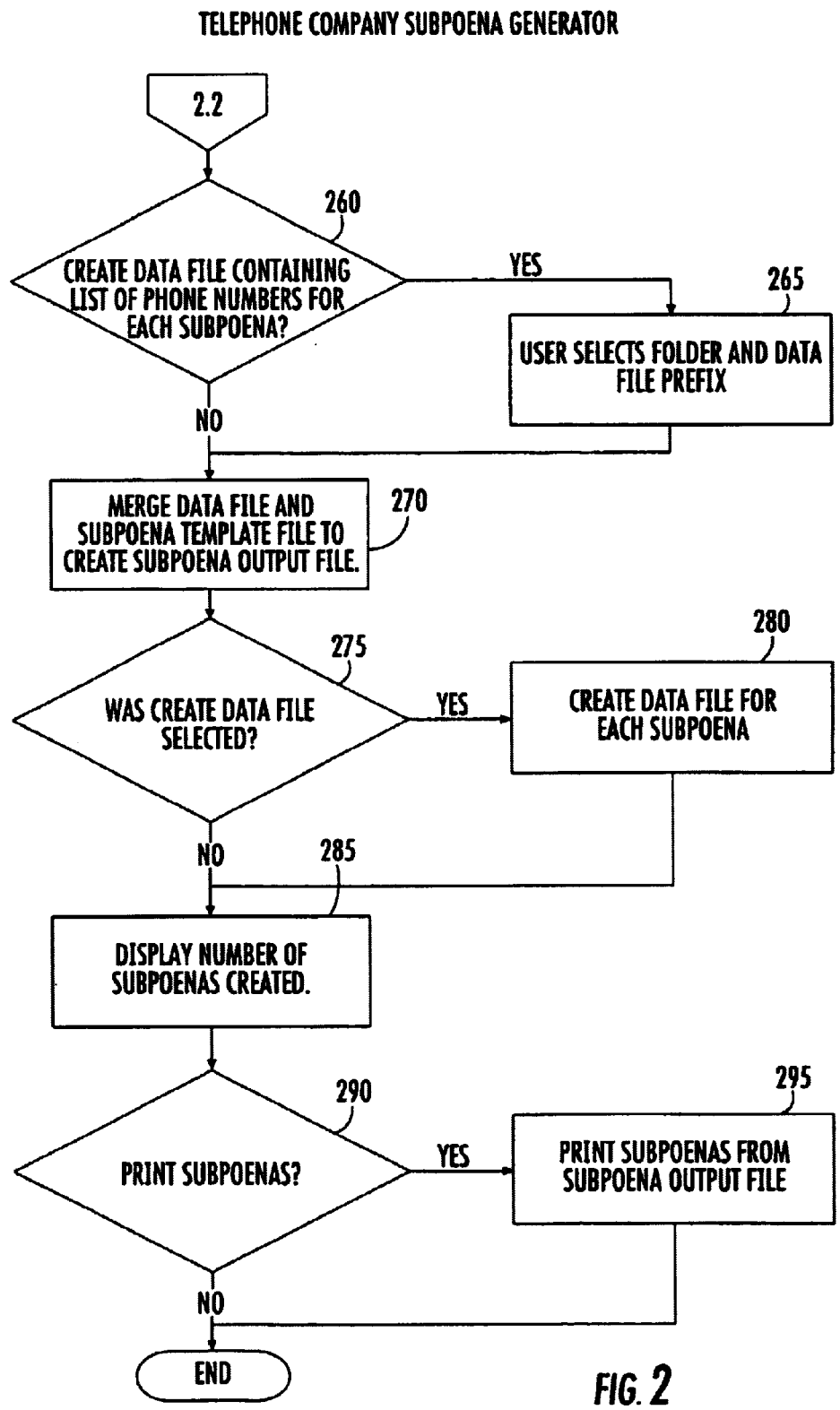
FIG. 2 (CON'T)

METHOD AND SYSTEM FOR SUBPOENA GENERATION INCLUDING TIME-DEPENDENT REVERSE NUMBER SEARCH

FIELD OF THE INVENTION

The present invention relates to a method and system for document generation. More specifically, this invention relates to discovering telephone company contact information and generating subpoenas to obtain telephone company records.

BACKGROUND OF THE INVENTION

Law enforcement or regulator agencies, such as the FBI, police, SEC, in the course of investigating potentially criminal activities have a need to correlate one or more telephone numbers to associated subscribers' name and address. For example, a law enforcement agency may first obtain a list of telephone numbers that a person under investigation has called. A law enforcement agency may be interested in knowing information about the persons called to determine additional parties that may be involved in a suspected criminal activity. A law enforcement agency may subpoena telephone company records to obtain the name and address of the called party by issuing a subpoena. After a called party's name and address is known from the telephone company records, the law enforcement agency can contact the called party. For example, a law enforcement agency can issue a second subpoena to compel a called party to appear at a specified place and time to answer questions or provide additional information.

Searching for a subscriber's name and address using reverse directories is well known in the art. These directories are available from the telephone company directory assistance and numerous Internet web sites. However, these databases only provide current subscriber information. Records of previous telephone companies or subscribers assigned a specified telephone number are not readily available. In addition, subscriber's can block access of their telephone number from the public records, and consequently, the Internet web sites. Hence, to obtain a subscriber's name and address, law enforcement agencies must subpoena subscriber information directly from the subscriber's telephone company. The subscriber's telephone company can be easily determined from available records by using the assigned Number Plan Area-Central Office Code, i.e., NPA-NXX. Number Plan Area (NPA) numbers are assigned by the North American Number Plan Administration and are commonly referred to as "area codes." Central Office Code (NXX) numbers are commonly referred to as "telephone exchanges." For example, "212-884" refers to the 884 telephone exchange in New York City, i.e., area code 212.

When there were relatively few telephone companies and one telephone company was assigned the majority of subscribers in a state, the process of determining an appropriate telephone company using a reverse directory was a relatively straight-forward process. However, telephone deregulation and recent rule changes have contributed to an increase in the number of telephone companies. And, consequently, an increase in the complexity of quickly, and accurately, determining the appropriate telephone company using a reverse telephone directory search. For example, telephone deregulation has significantly increased the number of telephone companies that are assigned NPA-NXX numbers. Currently, the pool of NPA-NXX numbers are assigned to companies such as Verizon, BellSouth, Highland Telephone Cooperative, etc., which are LECs (Local Exchange Carriers). In addition, telephone numbers are assigned to smaller telephone companies, such as, CLECs (Competitive Local Exchange Carriers), wireless companies, and paging companies. Many of these companies did not exist when the telephone company reverse records were first employed. Further, the Federal Communication Commission (FCC) has changed the rules for issuing telephone numbers from a minimum of 10,000 numbers (i.e., the four digits of the telephone after the NXX exchange number) to a minimum of 1,000 numbers ("thousand line pooling"). Hence, telephone numbers that were in the past assigned to a single telephone company can now be assigned to up to ten different companies. Further, the FCC requires that telephone numbers that have not been used by an assignee telephone company are returned, i.e., given back. The returned numbers can then be assigned to another company.

Thus, when a law enforcement agency is required to determine a subscriber name and address from a telephone number, the agency must first determine the appropriate telephone company assigned to the telephone number at the time of interest. Otherwise, the subscriber name and address obtained from an incorrectly determined telephone company results in the wrong subscriber being subpoenaed or questioned. This incorrect determination of the telephone company and subscriber burdens the agency, and telephone companies, as valuable time is lost while the reverse directory search is repeated and resources are expended on needless questioning and interviewing. Hence, there is a need to provide reverse directory searches that are performed in a timely, and efficient, manner and provide accurate telephone company NPA-NXX telephone assignment.

SUMMARY OF THE INVENTION

A method of generating subpoena information based on specified telephone numbers using a time dependent data base is presented. Employing reverse number data base searches, the name and contact address information items associated with a telephone company assigned a specified telephone number at a designated time, or during a specified period of time may be obtained. At least one document, e.g., a subpoena, is then generated to compel the selected telephone company or companies to reveal information items, such as the names and addresses of subscribers associated with a specified telephone number at a designated time or during a designated time period. The method further enables additional subpoenas to be generated using the subscriber information items disclosed by the designated telephone company.

Figure 1:
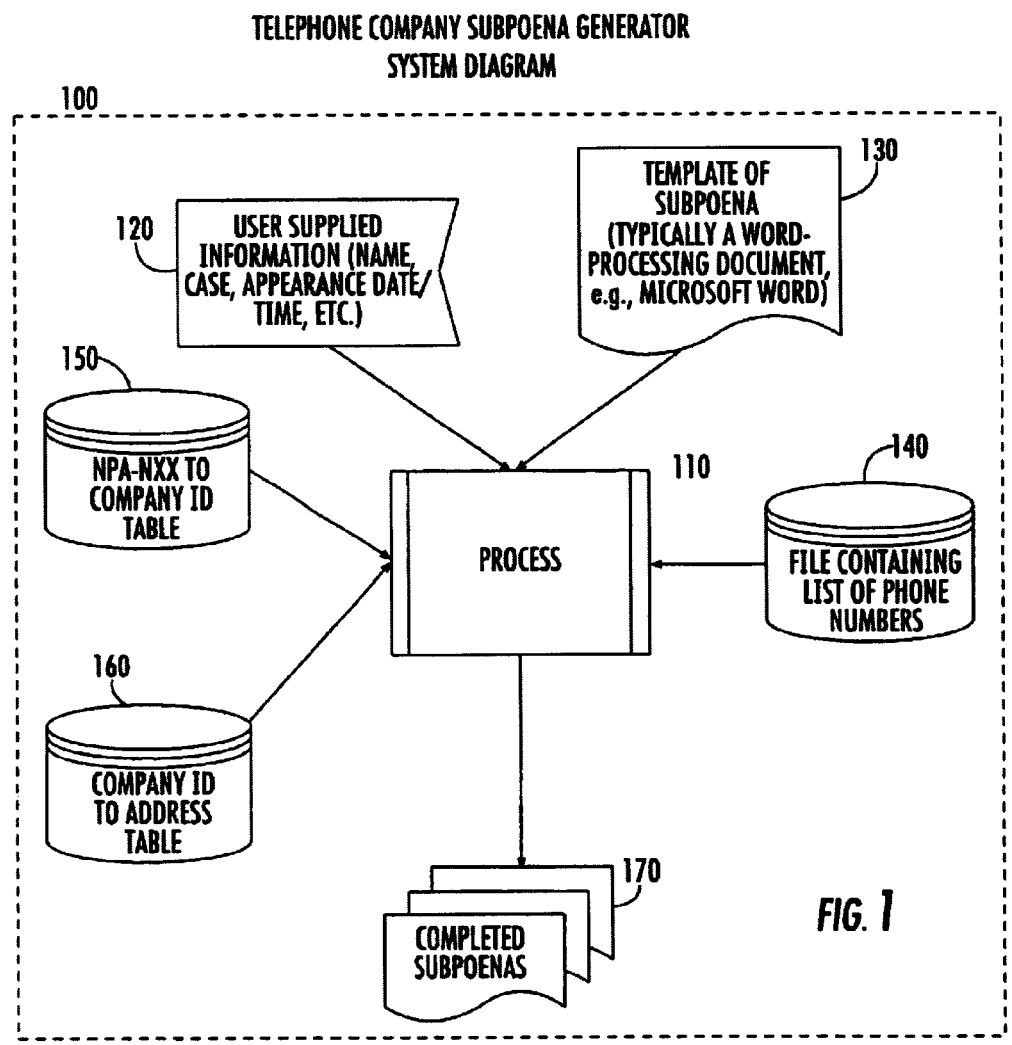
FIG. 1 illustrates an overview of an exemplary system in accordance with the principles of the invention.

It is to be understood that these drawings are solely for purposes of illustrating the concepts of the invention and are not intended as a definition of the limits of the invention. It will be appreciated that the same reference numerals, possibly supplemented with reference characters where appropriate, have been used throughout to identify corresponding parts.

DETAILED DESCRIPTION OF THE INVENTION

FIG. 1 depicts an exemplary system 100 illustrating the concept underling the instant invention. In this illustrative representation, system 100 is composed of process 110, user supplied data items and search criteria 120, template data items 130, user selected telephone number 140, and data bases 150 and 160. The outputs of system 100 are documents or subpoena 170.

Processing element 110 includes hardware items, such as a personal computer, and software items contained therein, which is used to search, compare and identify information items, such as names and addresses, within designated data bases, which match specified search criteria, such as telephone numbers, time period, etc. Processing element 110 is further operative to generate subpoena documents in a desired format using the identified data base information items.

User supplied data items 120 include information that may be included on generated documents 170. For example, the name of the authority authorizing the issuance of the subpoena, a data, a time, a place, etc., may be provided by a user and placed on the generated documents. These information items can be supplied to process 110 manually, for example by entry on a computer keyboard (not shown), or dynamically, for example, by reading from a data file (not shown). Templates 130 are representative of the format of the desired document output, which contain known data entry keys or bookmarks that specify where, and which, information items are placed on document 170. Creation and use of templates is well known in the art.

User supplied telephone phone number items, as represented by data base 140, includes information items that are used to search relevant data bases, such as the illustrated "NPA-NXX to Company ID" data base 150 and "Company ID to Address" data base 160. The user supplied selection criteria are used to cull selected information items from data bases 150 and 160. As would be appreciated, a plurality of selection criteria, such as telephone numbers, dates the telephone numbers were referenced or called or time periods, i.e., days, weeks, months, etc., telephone numbers were referenced or called can used by processing element 110 to select records from data base 150 for processing. Alternatively, selected telephone numbers may be dynamically input into processing element 110 by a manual entry, for example, a keyboard (not shown).

Data base 150 is representative of a time-dependent reverse telephone number directory containing information items relating to assignment of blocks of telephone numbers or specific telephone numbers to particular telephone companies. Data base 160 is representative of a data base containing the telephone company name, address and in some cases, contact information regarding legal matters, such as an authorized agent to receive service of process, i.e., the delivery of subpoenas.

Document 170 is representative of subpoena documents generated by processing element 110 using templates 130 and including the user supplied data items 120 and information items from data base 150 and data base 160. Document 170 may be prepared in paper form or may be generated in electronic form, such as a data file.

Figure 2:
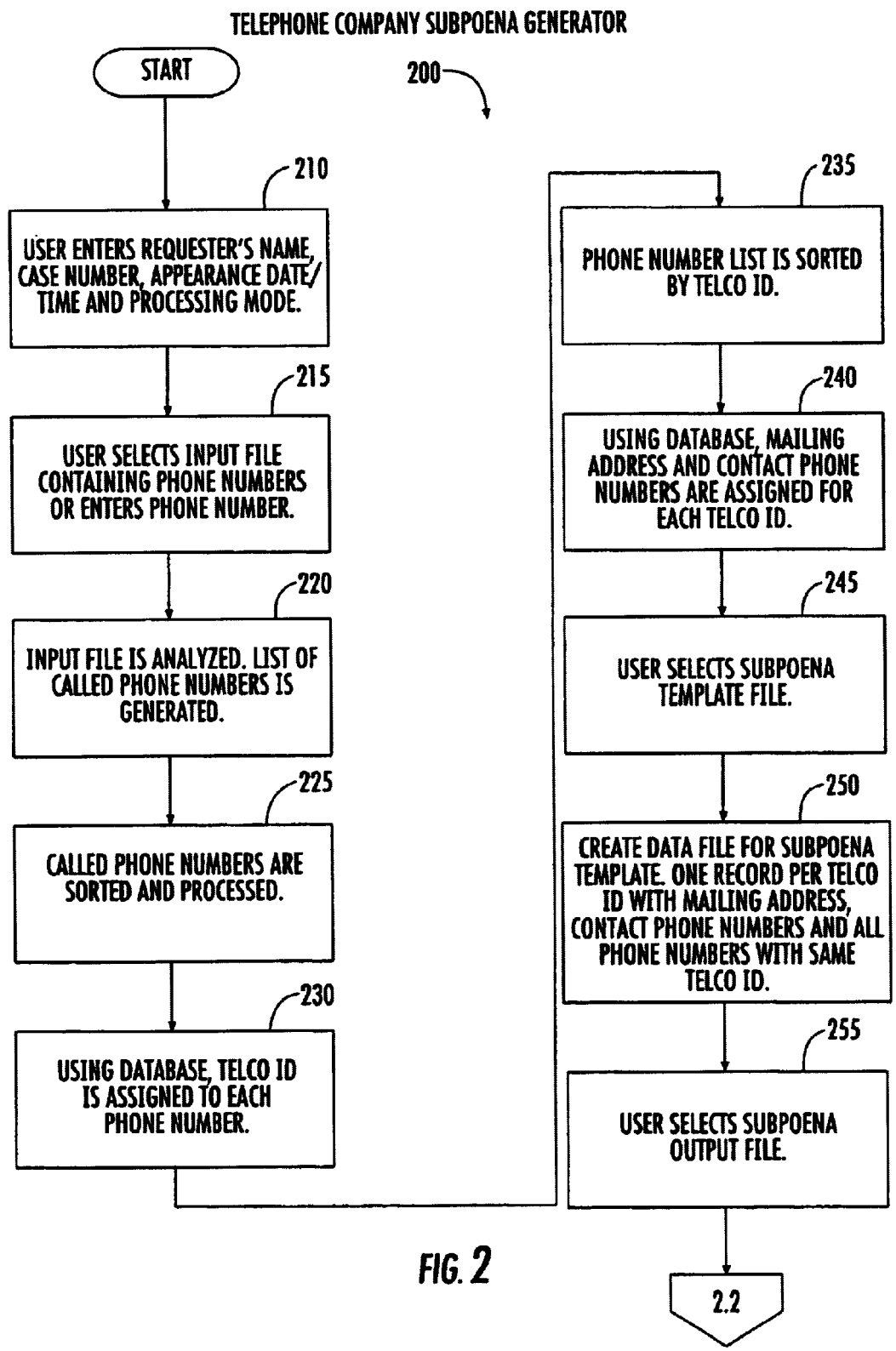
FIG. 2 illustrates an overview of an exemplary processing flow chart in accordance with the principles of the invention.

FIG. 2 illustrates an exemplary processing 200 of processing element 110 in accordance with the principles of the invention. Upon entry, user supplied selection criteria 120 are entered, at block 210. User supplied telephone numbers 140 are next entered, at block 215. A list of referenced, or called, telephone numbers that meet the selection criteria is generated at block 220. At block 225, the list of telephone numbers is sorted, for example, by NPA-NXX (area code-exchange). Each entry on the sorted list of telephone numbers is next compared, at block 230, to a list of telephone companies that were assigned the specified telephone numbers. For each entry on the sorted list of called telephone numbers, at least one telephone company can be identified. Using a second search criteria, such a date or time period, at least one telephone company can be identified that was assigned the specified telephone number on a date or time period. The identified telephone companies are sorted, for example, by NPA-NXX, at block 235, to group together called telephone numbers by telephone company. For each of the identified telephone companies, information items, such as contact name, mailing address, fax telephone number, electronic mail address, web site address, etc., can be extracted from the data base, at block 240. Specified contact information can be qualified by the telephone company to conform to the procedures implemented to respond to legal matters, e.g., process requests for subscriber contact information made by subpoena.

A template to be used for a designated issuing authority is then selected at block 245. The document form, fonts, format and textual wording can be prescribed for different issuing authorities. For example, templates having different form, fonts, format, and textual wording are used based on the jurisdictional authority of the issuing authority. For example, a designated court, or regulatory agency, may be representative of the authority authorizing the issuance of a subpoena. Further, a date, a time and a location may be included on the generated documents. At block 250, a document, represented by at least one electronic file, is then prepared for each of the identified telephone companies. At block 255 the user selects the subpoena output file.

At block 260, a determination is made as to whether to produce output data files containing the list of phone numbers on the subpoenas. If the determination is in the positive, one data file is produced for each subpoena, which is named by the user, at block 265. The selected data file, created at block 250, is then merged with the selected template and a document output data file is created at block 270.

At block, 275, a determination is made as to whether document output data files were selected. If the determination is in the affirmative, then an output data file is created for each document, at block 280. The number of documents generated is then displayed, at block 285.

A determination is then made, at block 290, to determine whether the generated documents are to be printed. If the determination is in the affirmation, then the documents are printed, at block 295. Otherwise, the documents are available in electronic form for transmittal to telephone companies that desire electronic transmittal of documents.

Figure 3:
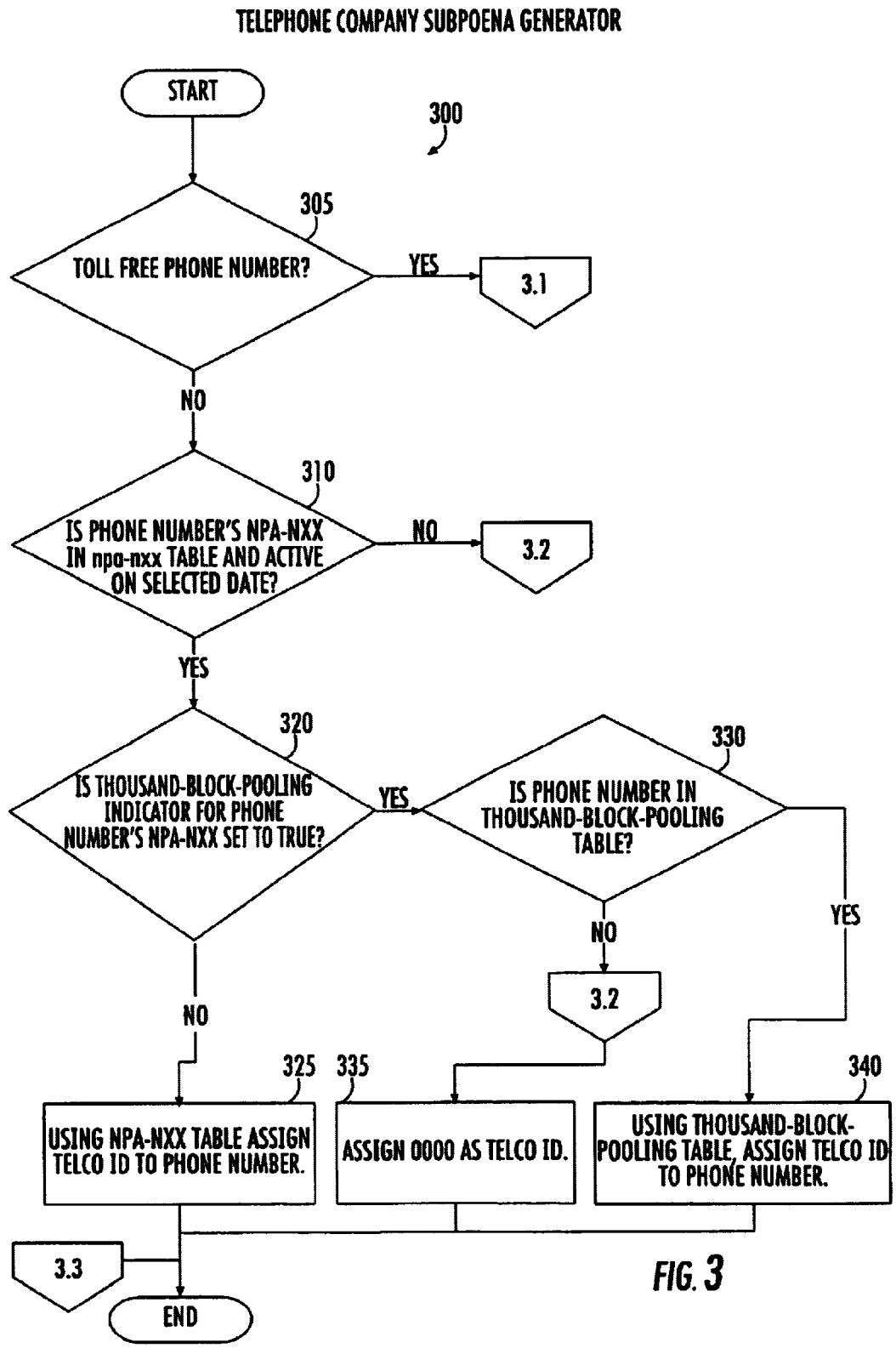
FIG. 3 illustrates an exemplary search process flow chart in accordance with the principles of the invention.
Figure 3:
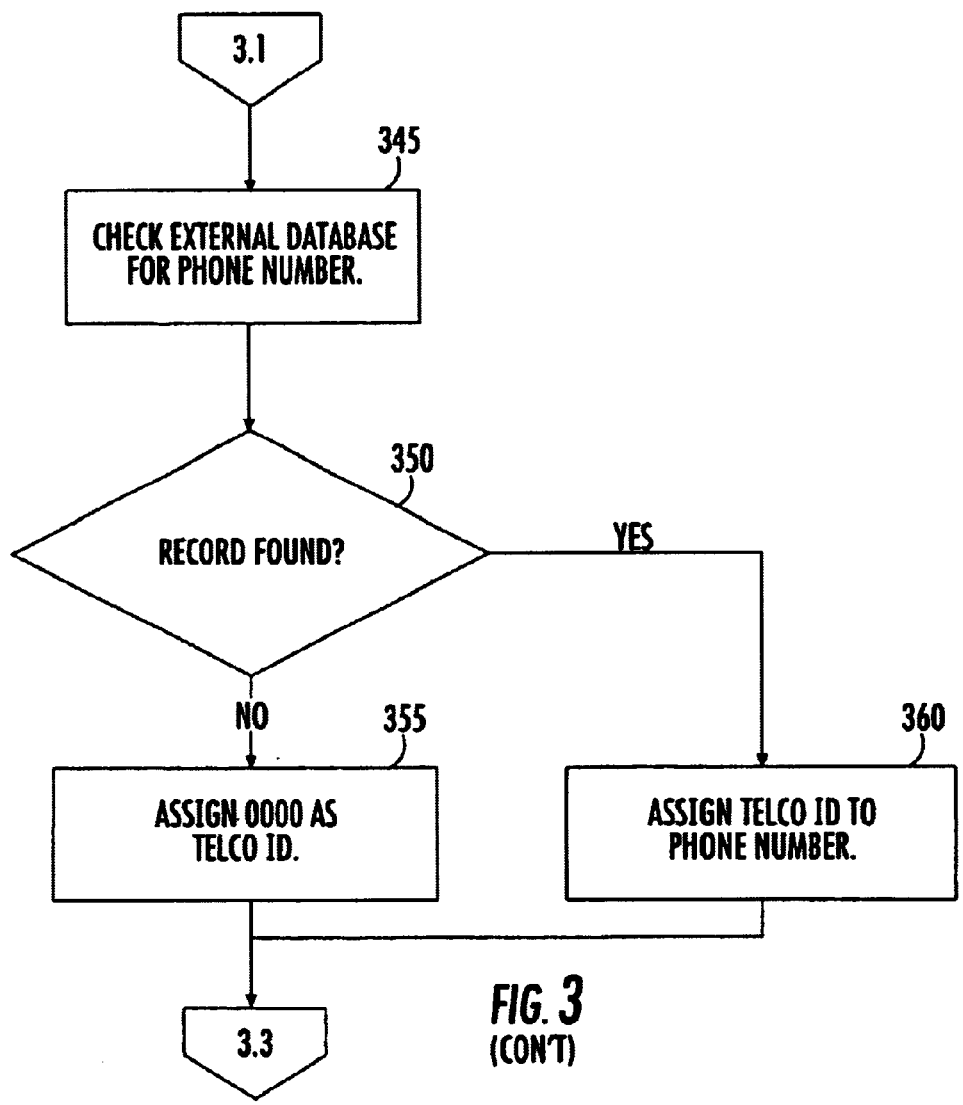

FIG. 3 illustrates an exemplary processing 300 associated with reverse searching data base 150. In this exemplary processing, a selected telephone number or a selected telephone number decomposed into its NPA-NXX component elements is used to search data base 150. At block 305 a determination is made as to whether the selected telephone number is a toll-free number, i.e., NPA is, for example, 800, 877, 888, etc. If the determination is in the negative, then a determination is made, at block 310, whether the telephone number is included in data base 150 and was active on a selected date or selected period of time. If the determination is in the affirmative, then a determination is made, at block 320, whether a selected telephone number is a 10,000 or 1,000 number assignment. If the determination is in the negative, i.e., 10,000 number assignment, then the telephone company identifier can be determined for that telephone company assigned the selected telephone number on a selected date at block 325. As would be appreciated, if a period of time was selected as a search criteria, then more than one telephone company may have been assigned the same telephone number during the period of time. The telephone identifier for each telephone company assigned the selected telephone number is then extracted from data base 150.

If the determination, at block 320, is in the affirmative, i.e., "thousand block pooling," then a determination is made, at block 330, of the telephone company assigned a specified telephone number using a thousand block pooling table. In this case, the telephone number elements NPA-NXX-Y, where Y is the next digit in the selected telephone number, are used to access a thousand block pooling table. If the determination, at block 330, is in the affirmative, then the telephone company assigned the selected telephone number on the selected date is identified, at block 340. If the determination, at block 330, is in the negative, then a default telephone company identifier, for example, 0000, is assigned, at block 335. The processing flow then exits.

Returning to block 305, if the determination is in the negative, then a determine is made, at block 345, of at least one data base containing toll-free NPA numbers. In one exemplary embodiment of the invention, there may be one data base for each NPA number associated with a toll-free number. A determination is made, at block 350, as to whether a record matching the selected telephone has been found. If the answer is in the affirmative, then the telephone company assigned the selected telephone number on the selected date is identified, at block 360. If the determination, at block 350, is in the negative, then a default telephone company identifier, for example, 0000, is assigned, at block 355.

Returning to block 310, if the determination is in the negative, i.e., no telephone company was assigned the selected NPA-NXX components on the selected date, then a default telephone company identifier, for example, 0000, is assigned as the telephone company identifier, at block 335.

Figure 4:
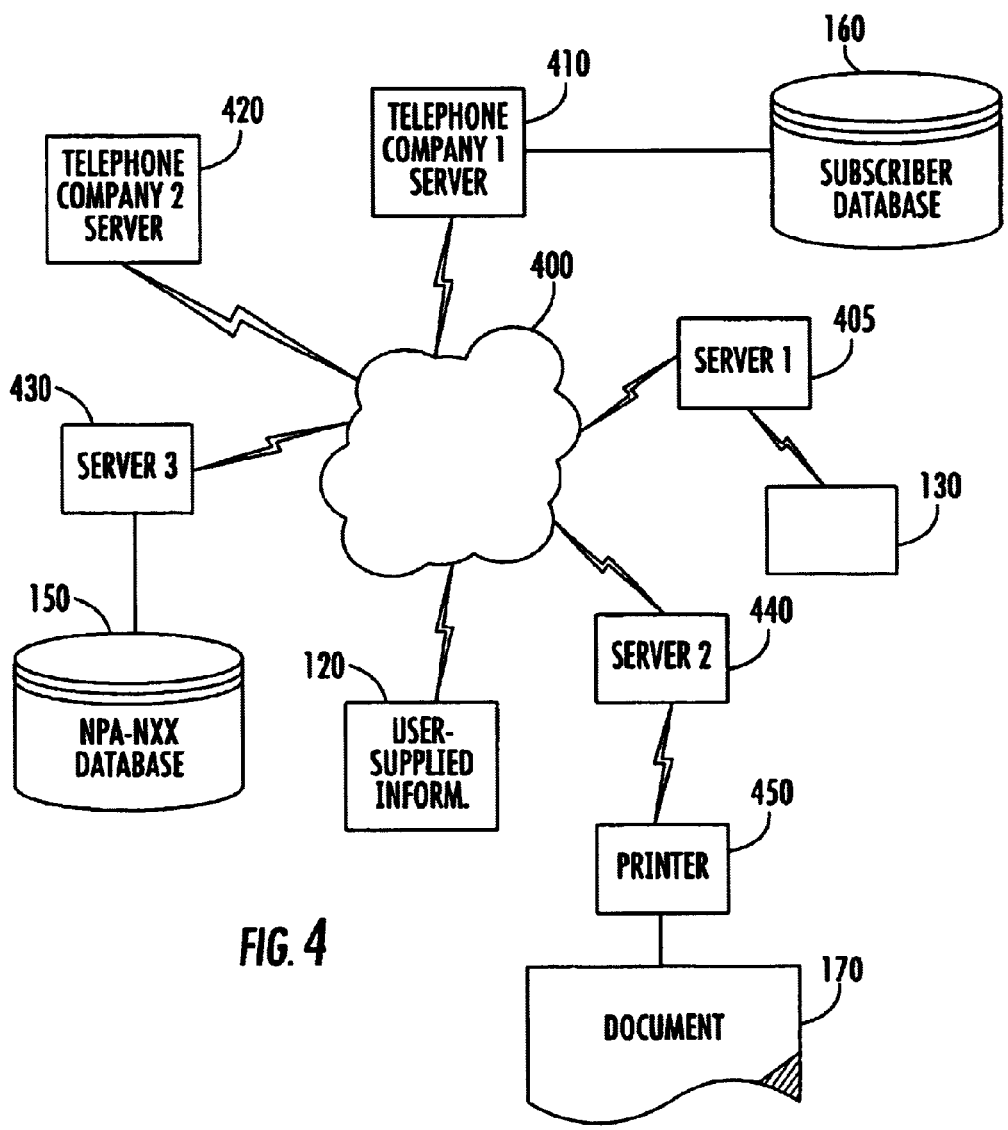
FIG. 4 illustrates an exemplary embodiment of the invention.

FIG. 4 illustrates an exemplary network configuration using the principles of the invention disclosed herein. In this exemplary network configuration, a plurality of computers or servers communicate over network 400, such as the Internet, the telephone system network, etc. In this illustrative example, server 1 405 includes processing element 110. Processing element 110 is operative to receive user selected input data 120 and forms 130 over network 400 or directly through a manual entry device (not shown). In this illustrative example, input data 120 is received by Server 1 405 over network 400 while forms 130 is entered directly into server 1 405. Server 1 405, after receiving the user selected input data 120, form data 130 and telephone number list 140 (not shown), processing element 110 can then access, over network 400, data base 150 through Server 3 430. The results of the data base search, such as telephone company identifiers, contact names, mailing address, e-mail address, etc., are then returned to server 1 405 for processing in accordance with the principles of the invention.

Server 1 405 may then communicate with a local or at least one remotely located printing device to print, i.e., generate, the required documents. In this illustrative example, server 1 405 is in communication with server 2 440 to generate document 170 through printing device 450. Server 2, for example, may be a designated server or computer system at a location, which a telephone company has registered to receive documents generated in accordance with the principles of the invention. That is, server 2 may be located at an office of a agent authorized to receive subpoena documents or requests for information.

In an alternative embodiment, server 1 405 may be in communication with telephone company servers authorized to receive documents generated by processing element 110. For example, server 1 405 can electronically send documents to telephone company 1 server 410 and telephone company 2 server 420. Included in the electronically transferred documents is an output data file containing a list of telephone numbers assigned to the respective telephone companies at a specified time or during a specified time period. Telephone company 1, for example, upon electronically receiving a list of telephone numbers may then access its subscriber telephone number data base, e.g., illustrated as data base 160, to obtain the requested subscriber information. Telephone company 1 server 410 may then return the requested subscriber information electronically to server 1 405.

Server 1 405, in obtaining the subscriber contact information can then generate documents, e.g., letters, subpoenas, etc., to request or compel the designated subscriber contact the agency or to appear at a designated time and place.

While there have been shown, described and pointed out fundamental novel features of the present invention as applied to preferred embodiments thereof, it will be understood that various omissions and substitutions and changes in the methods described and in the form and details of the devices disclosed, and in their operation, may be made by those skilled in the art without departing from the spirit of the present invention. For example, it is expressly intended that all combinations of those elements and/or method steps which perform substantially the same function is substantially the same way to achieve the same results are within the scope of the invention. Substitutions of elements from one described embodiment to another are also fully intended and contemplated.

I claim:

1. A computer implemented method of generating a subpoena document requesting information about an unknown subscriber from a telephone company using a telephone number of the unknown subscriber, the telephone number containing at least an area code and an exchange, the method comprising the steps of:
   a. providing at least one data base containing a plurality of dates, a plurality of telephone numbers and a plurality of telephone companies, each of the telephone numbers assigned to a certain one of the telephone companies on each of the dates;
   b. providing a first telephone number of an unknown subscriber, the first telephone number of the unknown subscriber, the telephone number containing at least an area code and an exchange and having a call date;
   c. selecting from the plurality of dates a date that matches the call date;
   d. selecting from the plurality of telephone numbers a telephone number that matches the first telephone number of the unknown subscriber on the selected date;
   e. extracting from the at least one data base information items associated with the telephone company assigned to the selected telephone number; and f. generating the subpoena document using the information items.

2. The method as recited in claim 1 wherein the document is a subpoena.

3. The method as recited in claim 1 wherein the information items include telephone company contact information including a contact name and a contact address.

4. The method as recited in claim 1 further comprising the step of providing at least a second telephone number of an unknown subscriber, the at least a second telephone number containing at least an area code and an exchange and having a call date, and repeating steps b–e to generate additional information items for use in step f.

5. The method as recited in claim 1 further comprising the step of providing at least a second telephone number of an unknown subscriber, the at least a second telephone number containing at least an area code and an exchange and having a call date, and repeating steps b–f.

6. The method as recited in claim 1 further comprising the step of providing user supplied information items, the user supplied information items being used in step f for generating the document.

7. The method as recited in claim 6 wherein the user supplied information items include at least one of a name of the authority authorizing issuance of the document, a date, a time, and a location.

8. A system for generating a subpoena document requesting information about an unknown subscriber from a telephone company using a telephone number of the unknown subscriber, the telephone number containing at least an area code and an exchange, the system comprising:

at least one data base including a plurality of dates, a plurality of telephone numbers and a plurality of telephone companies, each of the telephone numbers assigned to a certain one of the telephone companies on each of the dates;

a processor in communication with the at least one data base, the processor operative for:

a. receiving a user input including a first telephone number of an unknown subscriber, the first telephone number of the unknown subscriber containing at least an area code and an exchange and having a call date;

b. selecting from the plurality of dates a date that matches the call date;

c. selecting from the plurality of telephone numbers a telephone number that matches the first telephone number of the unknown subscriber on the selected date;

d. extracting the at least one data base information items associated with the selected telephone company assigned to the selected telephone number; and e. causing the subpoena document to be generated using the information items.

9. The system as recited in claim 8 the document is a subpoena.

10. The system as recited in claim 8 wherein the information items include telephone company contact information including a contact name and a contact address.

11. The system as recited in claim 8 wherein the processor is further operative for receiving another user input including at least a second telephone number of an unknown subscriber, the at least a second telephone number containing at least an area code and an exchange and having a call date, and repeating steps b–d to generate additional information items for use in step e.

12. The system as recited in claim 8 wherein the processor is further operative for receiving another user input including at least a second telephone number of an unknown subscriber, the at least a second telephone number containing at least an area code and an exchange and having a call date, and repeating steps b–e.

13. The system as recited in claim 8 wherein the processor is further operative for receiving user supplied information items, the user supplied information items being used in step e for generating the document.

14. The system as recited in claim 13 wherein the user supplied information items include at least one of a name of the authority authorizing issuance of the document, a date, a time, and a location.

* * * * *